(12) United States Patent
Tatsumi

(10) Patent No.: US 10,109,040 B2
(45) Date of Patent: Oct. 23, 2018

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Eisaku Tatsumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/614,721

(22) Filed: Jun. 6, 2017

(65) Prior Publication Data

US 2017/0365039 A1    Dec. 21, 2017

(30) Foreign Application Priority Data

Jun. 21, 2016  (JP) ................. 2016-122881

(51) Int. Cl.
*H04N 5/208* (2006.01)
*G09G 3/00* (2006.01)
(Continued)

(52) U.S. Cl.
CPC .......... *G06T 3/4053* (2013.01); *G06T 3/0093* (2013.01); *G09G 3/00* (2013.01);
(Continued)

(58) Field of Classification Search
CPC ..... G06T 3/4053; G06T 3/0093; G06T 15/50; G09G 3/00; H04N 5/208; G06K 7/1469
See application file for complete search history.

(56) References Cited

U.S. PATENT DOCUMENTS 5,822,008 A * 10/1998 Inoue ............. H04N 7/012
                                            348/446
9,653,026 B2  5/2017 Tatsumi
(Continued)

FOREIGN PATENT DOCUMENTS

| JP | 2010-021808 A | 1/2010 |
|----|---|---|
| JP | 2011171801 A | 9/2011 |
| JP | 2014-033357 A | 2/2014 |

OTHER PUBLICATIONS

Japanese Office Action dated May 28, 2018 in corresponding Japanese Patent Application No. 2016-122881 with English translation.

*Primary Examiner* — Hung Lam
(74) *Attorney, Agent, or Firm* — Carter, Deluca, Farrell & Schmidt LLP

(57) ABSTRACT

An image processing apparatus comprising: an input unit configured to input image signals which include a first signal and a second signal lower in spatial resolution than the first signal; an obtaining unit configured to obtain information about a spatial high-frequency component of the first signal which is included in the image signals input by the input unit; a generation unit configured to generate an expanded second signal obtained by expanding the spatial resolution of the second signal included in the image signals by using the information about the spatial high-frequency component of the first signal obtained by the obtaining unit; and an output unit configured to output a processed image signal which includes the expanded second signal generated by the generation unit.

20 Claims, 11 Drawing Sheets

(51) Int. Cl.
*G06T 3/40* (2006.01)
*G06T 3/00* (2006.01)
G06K 7/14 (2006.01)
G06T 15/50 (2011.01)

(52) U.S. Cl.
CPC ........... *H04N 5/208* (2013.01); *G06K 7/1469* (2013.01); *G06T 15/50* (2013.01)

(56) References Cited

U.S. PATENT DOCUMENTS

| | | | |
|---|---|---|---|
| 2002/0031277 A1* | 3/2002 | Lubin | G06T 5/50 382/254 |
| 2016/0163068 A1 | 6/2016 | Uemura et al. | |
| 2016/0282707 A1 | 9/2016 | Tatsumi | |
| 2017/0214884 A1 | 7/2017 | Tatsumi | |

* cited by examiner

FIG. 3

301 LOW-PASS FILTER | 1 | 2 | 1 | TOTAL/4

302 HIGH-PASS FILTER | -1 | 2 | -1 | TOTAL/4

303 HORIZONTAL TYPE EDGE DETECTION FILTER | -1 | 0 | 1 | TOTAL/2

304 LOW-PASS FILTER

| 1 | 2 | 1 |
|---|---|---|
| 2 | 4 | 2 |
| 1 | 2 | 1 |

TOTAL/16

305 HIGH-PASS FILTER

| -1 | -2 | -1 |
|----|----|----|
| -2 | 12 | -2 |
| -1 | -2 | -1 |

TOTAL/16

306 VERTICAL TYPE EDGE DETECTION FILTER

| -1 |
|----|
| 0  |
| 1  |

TOTAL/2

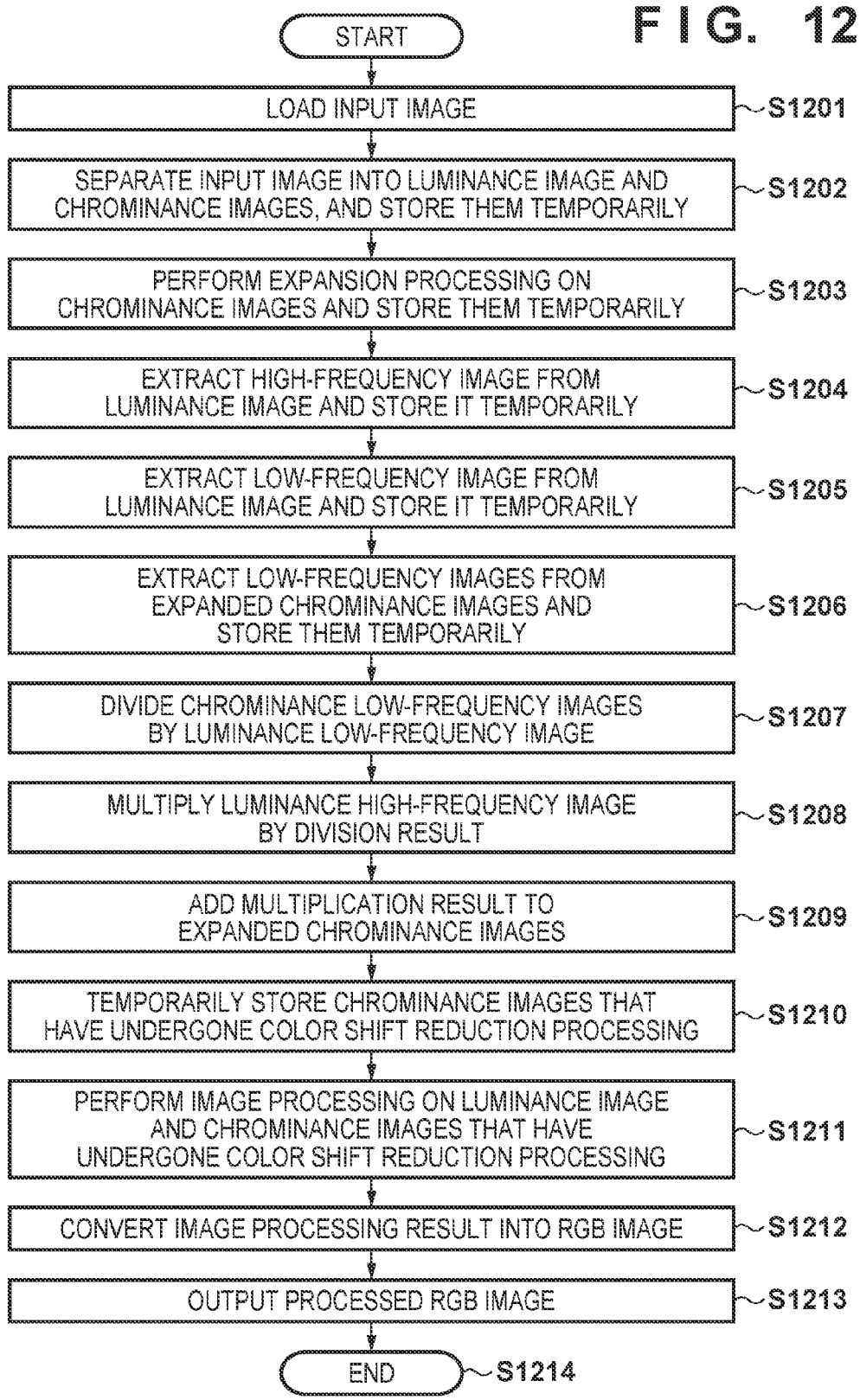

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

Conventionally, a luminance signal and chrominance signals in a video signal are transmitted as they have different resolutions. In HD (High Definition) video or SD (Standard Definition) video for interlaced scanning (interlacing), transmission is often performed by a signal format called a 422 format. The 422 format is a format for storing red chrominance signals for two pixels and blue chrominance signals for two pixels with respect to luminance signals for four pixels, reducing the resolution of the chrominance signals to half that of the luminance signals. This utilizes the fact that the visual characteristics of human eyes is sensitive to a luminance change but is comparatively insensitive to a color change in order to save a signal band needed for transmission and recording.

Recently, UHD (Ultra High-Definition) video at a 4K resolution and SHV (Super High-Definition) video at an 8K resolution have started to be broadcasted and distributed by media. These signal formats are sequential scanning (progressive), and their mainstream is a format called a 420 format. In the 420 format, there are only a red chrominance signal for one pixel and a blue chrominance signal for one pixel out of luminance signals for two vertical pixels and for two horizontal pixels, a total of four pixels. In this case, the resolutions of the chrominance signals are ½ of those of luminance signals in vertical and horizontal directions, respectively, and reduced to a quarter in total.

Note that a spatial frequency is reduced to half when reduction processing is performed, generating moiré easily. To cope with this, when chrominance signals are reduced, occurrence of moiré is prevented by passing them through an LPF (low-pass filter).

The 422 format and the 420 format are effective for saving a necessary band in transmission and recording. In order to perform final display, however, the format needs to be reset to a 444 format in which luminance/chrominance signals are at the same resolution. Even when the luminance/chrominance signals are converted from the 422 format or the 420 format to a RGB signal directly, the RGB signal is in the 444 format.

When this 422 format or 420 format is reset to the 444 format, a process of expanding the chrominance signals is performed. While a luminance value is obtained for every pixel, one piece of chrominance component information is for two pixels in the vertical or horizontal direction. Consequently, in a portion where the luminance value changes greatly between two pixels, the chrominance signals cannot cope with that change, causing a disturbance called a color shift. The color shift refers to the shift of saturation or hues incident to a spatial positional shift between the luminance value and the chrominance signals. The color shift is very conspicuous in human vision, and thus becomes a factor that degrades image quality.

To cope with such a problem of image quality, each of Japanese Patent Laid-Open Nos. 2014-033357 and 2010-021808 describes an arrangement for reducing a color shift by referring to a change in luminance signal in chrominance signal expansion processing. Japanese Patent Laid-Open No. 2014-033357 describes an arrangement for linearly interpolating chrominance signals by referring to the change in luminance signal. Japanese Patent Laid-Open No. 2010-021808 describes an arrangement for matching a chrominance change direction with a change direction of the luminance signal by referring to the change in luminance signal.

However, the above-described conventional arrangement has the following problem. That is, if there is a vertical thin line in an original image in the 444 format, such a thin line is averaged and expressed by an intermediate value in chrominance signals in the 422 format. In this case, it is difficult to reduce a color shift of the thin line with the arrangement of Japanese Patent Laid-Open No. 2014-033357.

In the arrangement of Japanese Patent Laid-Open No. 2010-021808, increasing/decreasing directions are only aligned, and it is thus difficult to make an improvement in a thin-line portion where the increasing/decreasing directions are aligned originally. Furthermore, not that the chrominance signals are matched with the size of the luminance signal, only obtaining a poor effect of reducing the color shift.

As described above, in the conventional arrangement, it is impossible to reduce a color shift effectively when a high-frequency component at a spatial frequency is not included in the chrominance signals but only included in the luminance signal. Such a problem is common to signals not only in the 420 format but also in the 422 format and the 411 format different in resolution between the luminance signal and the chrominance signals.

The present invention provides a technique of reducing a color shift effectively for an image signal including a plurality of image component signals.

SUMMARY OF THE INVENTION

According to one aspect of the present invention, there is provided an image processing apparatus comprising: an input unit configured to input image signals which include a first signal and a second signal lower in spatial resolution than the first signal; an obtaining unit configured to obtain information about a spatial high-frequency component of the first signal which is included in the image signals input by the input unit; a generation unit configured to generate an expanded second signal obtained by expanding the spatial resolution of the second signal included in the image signals by using the information about the spatial high-frequency component of the first signal obtained by the obtaining unit; and an output unit configured to output a processed image signal which includes the expanded second signal generated by the generation unit.

Further features of the present invention will become apparent from the following description of exemplary embodiments with reference to the attached drawings.

BRIEF DESCRIPTION OF THE DRAWINGS

FIG. 3 is a view showing an example of each of LPFs, HPFs, and EDFs;

FIG. 12 is a flowchart showing color shift reduction processing by the microprocessor.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Processing Apparatus

Figure 1:
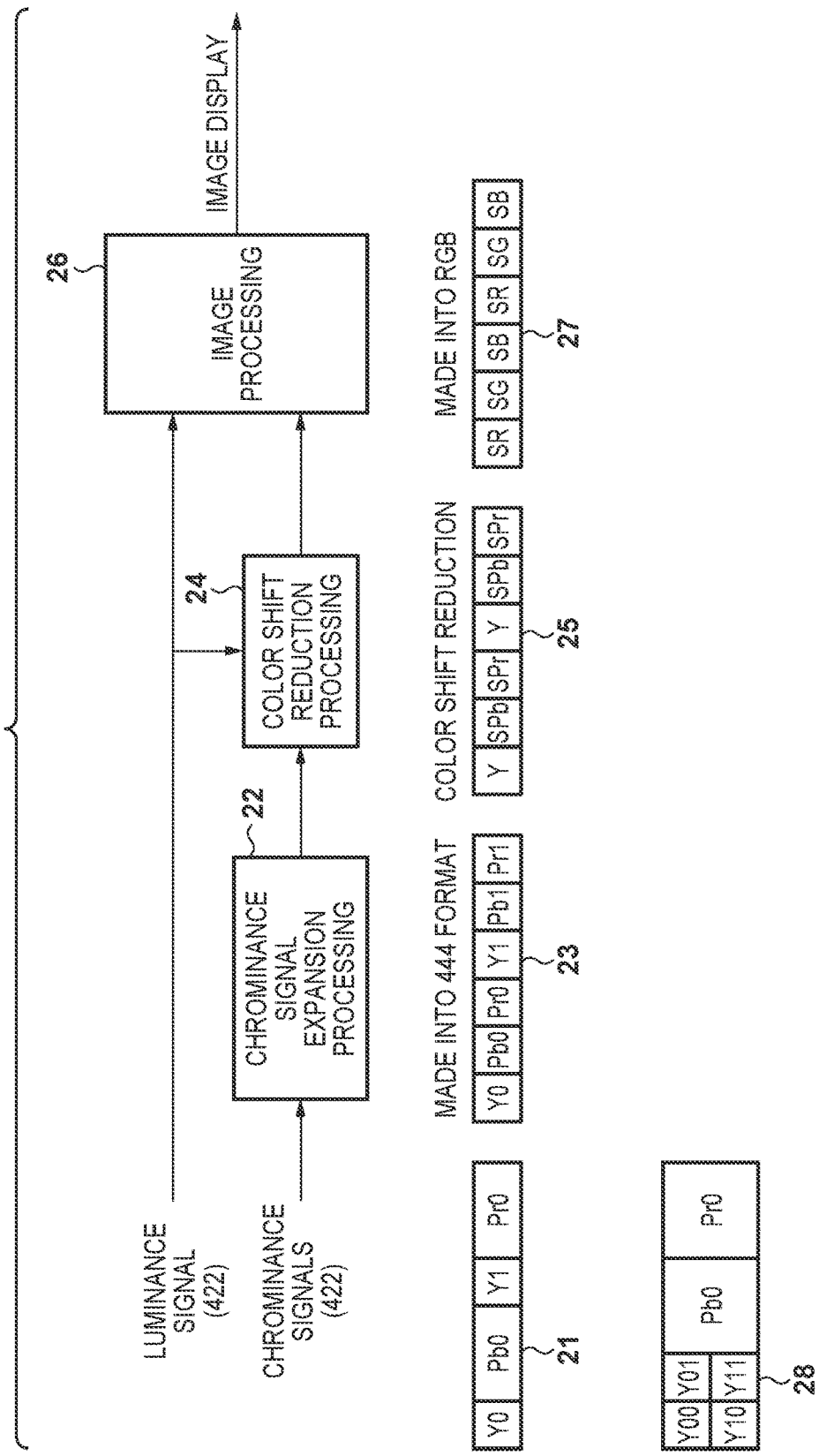
FIG. 1 is a block diagram showing the arrangement of an image processing apparatus.

The first embodiment will be described with reference to FIGS. 1 to 4. FIG. 1 is a block diagram showing the hardware arrangement of an image processing apparatus according to the first embodiment. However, at least some of blocks in FIG. 1 may be implemented by software. In FIG. 1, reference numeral 21 denotes luminance/chrominance signals in a 422 format serving as input signals. A chrominance signal expansion processing block 22 converts the input luminance/chrominance signals from the 422 format to a 444 format and outputs the converted signals to a color shift reduction processing block 24. Reference numeral 23 denotes luminance/chrominance signals converted into the 444 format by the expansion processing block 22. Reference numeral 24 denotes the color shift reduction processing block. Reference numeral 25 denotes luminance/chrominance signals in the 444 format that have undergone color shift reduction processing. Reference numeral 26 denotes a block which performs general image processing and color conversion into RGB. Reference numeral 27 denotes display signals made into RGB by the image processing block 26. Reference numeral 28 denotes luminance/chrominance signals when input signals are in a 420 format.

In the contents of disc media or a broadcast wave, luminance/chrominance signals are encoded (compressed). In the luminance/chrominance signals thus compressed, a method called the 422 format is known at a 2K resolution (HD: High-Definition) as a method of further thinning chrominance signals. The 422 format is a method in which chrominance signals in a horizontal direction are only half luminance signals. At a 4K resolution (UHD) or an 8K resolution (SHV), a method of thinning chrominance signals is a format called the 420 format, and a method is used in which the chrominance signals are half luminance signals not only in the horizontal direction but also in a vertical direction. Note that UHD is an abbreviation of Ultra High-Definition, and SHV is an abbreviation of Super Hi-Vision. Further, in DV (digital video of tape recording), a method is used which is a format called the 411 format, and in which chrominance signals in the horizontal direction are only a quarter of luminance signals. A method of this embodiment is applicable to all the methods in which these chrominance signals are smaller in number than the luminance signals. As an example of a method in which the resolution of the chrominance signals are lower than that of the luminance signals will be described below with a particular emphasis on the 422 format.

These compressed luminance/chrominance signals are first decoded (decompressed) by a decoder (not shown) and restored to the luminance/chrominance signals in an uncompressed state. The luminance/chrominance signals restored to the uncompressed state serve as the input signals 21 of this embodiment. In the input signals 21 in the case of 422 signals, only a Pb or Pr signal (chrominance signal) exists for each of two Y signals (luminance signals), and thus only Pb0 and Pr0 exist with respect to Y0 and Y1. Note that there are two cases in which the positions of Pb0 and Pr0 in the 422 format match Y0, and in which they are at the intermediate position between Y0 and Y1, the method of this embodiment is applicable to either case.

In the case of the 420 signals 28, the chrominance signals (PbPr signals) are only half the luminance signals in the vertical direction as well, and thus chrominance signals corresponding to luminance signals Y00, Y01, Y10, and Y11 are only Pb0 and Pr0. Note that there can be a case in which the positions of Pb0 and Pr0 in the 420 format are at the intermediate position between Y00 and Y10, a case in which they are at a position just in the center of Y00, Y01, Y10, and Y11, or a case in which the positions of Pb0 and Pr0 are exchanged depending on a frame. The method of this embodiment is applicable to either case.

In the chrominance signal expansion processing block 22, expanded chrominance signals are generated by expanding the chrominance signals in the horizontal direction in order to match the luminance signals and the chrominance signals in number. Two methods are generally used for this expansion processing.

One is a method of simply dividing each chrominance signal into two by the same value. That is, Pb1=Pb0 and Pr1=Pb0 hold.

The other is a method of performing interpolation with a next pixel. In this method, letting Pb2 and Pr2 be chrominance signals of the next pixel, Pb1=(Pb0+Pb2)/2 and Pr1=(Pr0+Pr2)/2 hold. Expansion processing by interpolation often obtains a better result. Therefore, in this embodiment, an example will be described in which expansion by interpolation is made in accordance with the latter method.

For the 420 signals 28, the expansion processing is also performed in the vertical direction in the same manner. In this embodiment, an example will be described in which expansion by interpolation is also made in the vertical direction.

Then, in the color shift reduction processing block 24, high-frequency components of chrominance signals PbPr are supplemented by using high-frequency components of luminance signals Y. With this processing, chrominance signals Spr and Spb with a reduced color shift are obtained. The color shift reduction processing block 24 will be described in detail later with reference to FIG. 2 and the like.

The signals 25 that have undergone the color shift reduction processing undergo other general image processing by the image processing block 26, and then output, as the signals 27 made into RGB signals, to a display apparatus (not shown) which displays an image, or a display control apparatus such as a panel driver or a timing controller.

Note that a signal conversion from the 422 format, the 420 format, or the 411 format to the 444 format may already been made at the preceding stage of this image processing shown in FIG. 1. In this case, a color shift has already occurred in a signal in many cases. If such a signal is input, it is possible, by inputting the signal to the color shift reduction processing block 24 directly without passing through the chrominance signal expansion processing block, to perform a process of reducing the color shift that has already occurred.

Arrangement of Color Shift Reduction Processing Block

Figure 2:
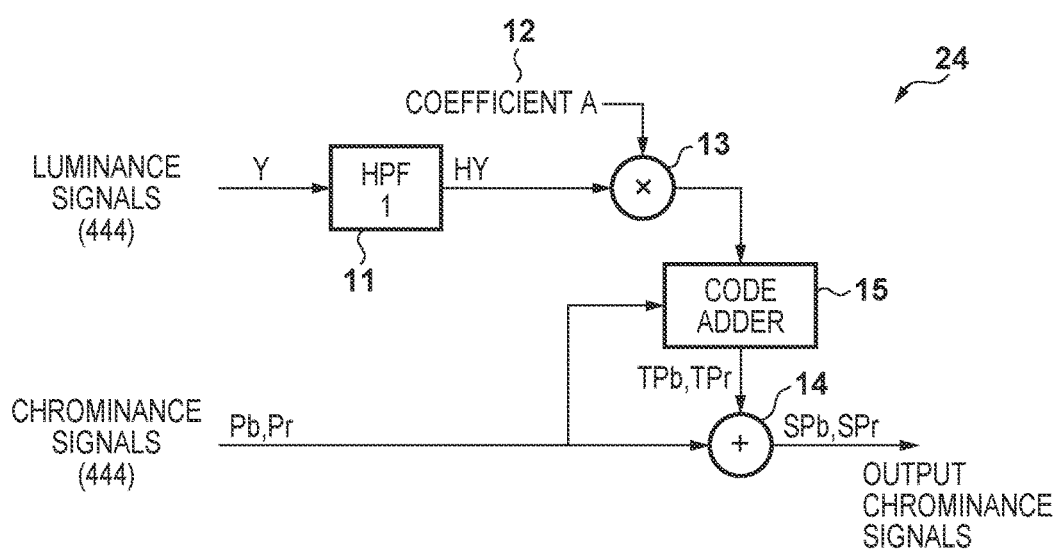
FIG. 2 is a view showing the arrangement of a color shift reduction processing block.

The inside of the color shift reduction processing block 24 will now be described with reference to FIG. 2. FIG. 2 is a block diagram showing the arrangement of the color shift reduction processing block 24 according to the first embodiment.

In FIG. 2, an HPF (high-pass filter) 11 extracts a high-frequency component of each luminance signal. A coefficient A 12 determines the contribution of a luminance high-frequency component. A multiplier 13 multiplies the high-frequency component of the luminance signal by the coefficient A 12. An adder 14 adds the high-frequency component multiplied by the coefficient A 12 to the chrominance signals, combining the both signals. A code adder 15 converts an input value into a complement in accordance with the positive/negative sign of each chrominance signal in order to match the positive/negative sign of the chrominance signal. Note that the chrominance signals in FIG. 2 are expanded chrominance signals whose resolution is expanded in the chrominance signal expansion processing block 22.

In the first embodiment, first, a high-frequency component HY of each luminance signal Y is extracted by using the HPF 11. Then, in order to set the high-frequency component HY of the luminance signal to be an optimum value by restricting it to some extent, the multiplier 13 multiplies the high-frequency component of the luminance signal by the coefficient A 12. Note that the coefficient A 12 is a value adjustable between, for example, about 0.1 and 2.0, and is predetermined in accordance with an instruction or the like by an image-quality designer or a user.

The code adder 15 matches an output (A×HY) of the multiplier 13 with the positive/negative signs of chrominance signals Pb and Pr. More specifically, the code adder 15 leaves the output alone if the chrominance signals Pb and Pr are positive and converts the output into a complement if the chrominance signals are negative values. The adder 14 adds TPb and TPr serving as outputs of the code adder 15 to the chrominance signals Pb and Pr, obtaining the output chrominance signals Spb and Spr. That is, Spb and Spr are calculated by:

$$SPb = Pb \pm A \times HY \text{ (minus(subtraction) is used if } Pb<0)$$

$$SPr = Pr \pm A \times HY \text{ (minus(subtraction) is used if } Pr<0)$$

Note that multiplication/division are prior to addition/subtraction in calculation order.

A processing order may be changed as follows:

$$SPb = HY \times (Pb/HY \pm A) \text{ (minus(subtraction) is used if } Pb<0)$$

$$SPr = HY \times (Pr/HY \pm A) \text{ (minus(subtraction) is used if } Pr<0)$$

Filter Arrangement

An example of the arrangement of each of HPFs, LPFs (low-pass filters), and EDFs (edge detection filters) used in the color shift reduction processing block 24 of FIG. 2 will now be described with reference to FIG. 3. The arrangement using each of the LPFs and the EDFs will be explained in embodiments to be described later.

FIG. 3 is a view showing an example of each of the LPFs, the HPFs, and the EDFs. An LPF 301 is used when an original signal is in the 422 format. An HPF 302 is used when the original signal is in the 422 format. A horizontal EDF 303 is used when the original signal is in the 422 format. An LPF 304 is used when the original signal is in the 420 format. An HPF 305 is used when the original signal is in the 420 format. A vertical EDF 306 is used together with the vertical EDF when the original signal is in the 420 format.

FIG. 3 shows coefficients multiplied with pixel values of pixels to be processed and pixel values of surrounding pixels when each pixel is brought into correspondence with the center of a table. When the original signal is in the 422 format, pixels only in the horizontal direction are referred to by using 301, 302, or 303. When the original signal is in the 420 format, the total of nine pixels in the horizontal direction and the vertical direction are referred to by using 304 or 305, and three pixels are referred to by using 303 and 306. The output of each filter with respect to a target pixel is obtained by multiplying reference pixels in the center and on the periphery by the coefficients in cells of the view, calculating its total, and dividing the obtained total by a value shown at right. Letting SF be a sampling frequency of a luminance signal, cutoff frequencies of the LPFs and the HPFs shown here are near SF/4.

The size and constant of each filter exemplified in FIG. 3 are merely an example. Any filter may be used as long as the cutoff frequency of each of the LPFs and the HPFs takes an upper limit to chrominance signals, that is, a value near SF/4. The value of each cutoff frequency is not necessarily limited to SF/4 but can be used even if the cutoff frequency increases/decreases slightly.

An LPF and an HPF with the size of, for example, 1×5, 1×7, 5×5, or 7×7 may be used. A filter having the size of 1×4, 1×5, or the like and the both sides of 1 or −1 can be used as an EDF.

Color Shift Reduction Processing

Figure 4:
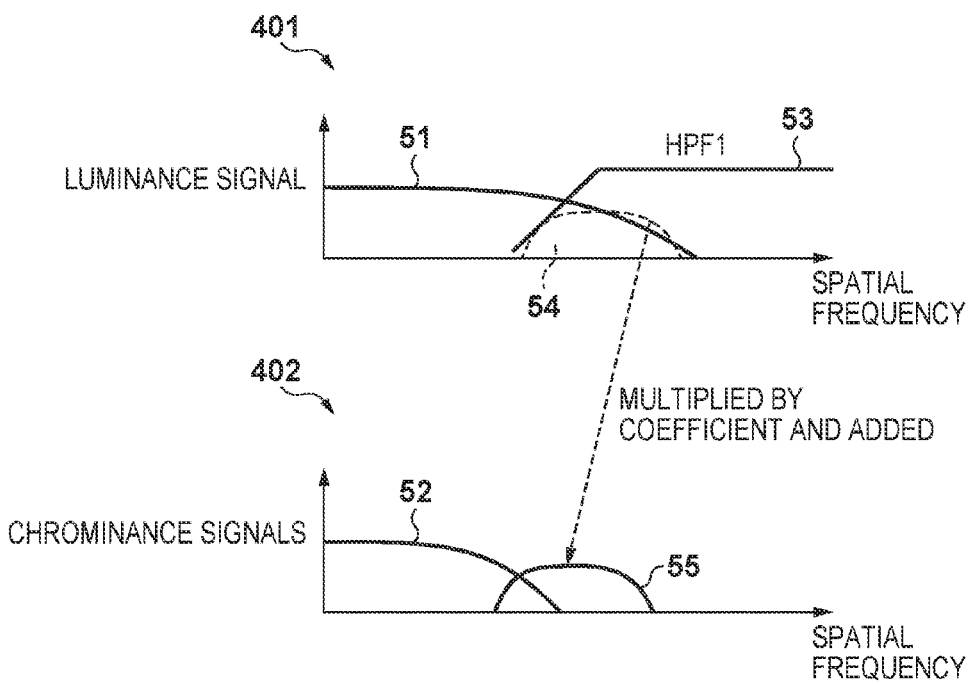
FIG. 4 shows explanatory graphs for explaining color shift reduction processing.

The operation principle of the color shift reduction processing block will now be described with reference to FIG. 4. FIG. 4 shows explanatory graphs for explaining color shift reduction processing. A graph 401 shows a spatial frequency distribution of a luminance signal. Reference numeral 402 denotes a spatial frequency distribution of chrominance signals.

In FIG. 4, reference numeral 51 denotes a distribution of the luminance signal with respect to a spatial frequency, reference numeral 52 denotes a distribution of the chrominance signals with respect to the spatial frequency, reference numeral 53 denotes a cutoff characteristic of the HPF, reference numeral 54 denotes a high-frequency component of the luminance signal by a dotted line, and reference numeral 55 denotes a high-frequency component added to the chrominance signals. In FIG. 4, the abscissa indicates the spatial frequency, and the ordinate indicates a spatial frequency component.

While the frequency distribution 51 of the luminance signal is distributed to a high frequency, the frequency distribution 52 of the chrominance signals is not distributed to the high frequency as compared with that of the luminance signal because they are expanded from the 422 format or the 420 format.

More specifically, letting SF be the sampling frequency of the luminance signal as described above, the spatial frequency is distributed up to SF/2 from the Nyquist theorem. The resolution of the luminance signal is equal to that of an input image, and thus the spatial frequency is distributed up to SF/2. The resolution of the chrominance signals is half that of the input image, and thus the spatial frequency is distributed up to only SF/4.

Therefore, the high-frequency component 54 in a frequency band not included in the chrominance signals but included in the luminance signal is extracted by using the HPF having a cutoff frequency characteristic close to SF/4 that is the highest spatial frequency of the chrominance signals.

Then, the high-frequency component 55 to be added to the chrominance signals is created by multiplying it by the appropriate coefficient A and adding it to the distribution 52 of the chrominance signals, obtaining the chrominance signals distributed up to a high-frequency region.

As described above, in this embodiment, image processing that involves expansion of the resolution of image component signals (chrominance signals) low in resolution is performed on an image signal including a plurality of image component signals different in resolution. Note that the image processing apparatus of this embodiment obtains a luminance signal from the image signal and obtains a high-frequency component signal of the luminance signal. Then, the image processing apparatus corrects an expanded image component signal obtained by expanding the resolution of the image component signal having the resolution lower than that of the luminance signal out of the plurality of image component signals included in the image signal with a correction value based on the high-frequency component signal of the luminance signal. More specifically, the chrominance signals are corrected by adding the correction value based on the high-frequency component signal of the luminance signal to the chrominance signals serving as the image component signals included in the image signal and different from the luminance signal. The chrominance signals lower in resolution are corrected by adding the high-frequency component signal which reflects a slight variation in the luminance signal as described above, making it possible to effectively correct a color shift between the chrominance signals and the luminance signal with a simple arrangement. Further, a value obtained by multiplying a high-frequency component signal of a luminance component by a predetermined coefficient is added when correcting the chrominance signals, making it possible to adjust the contribution of the high-frequency component of the luminance component appropriately in accordance with the characteristic or application of an image.

An example of the method of implementing the color shift reduction processing block 24 to add some of the high-frequency components of the luminance signals has been described so far. It is also possible, however, to perform a process of reducing a color shift by adding the high-frequency components of the luminance signals in various modes other than the first embodiment described above.

Second Embodiment

Arrangement of Color Shift Reduction Processing Block

Figure 5:
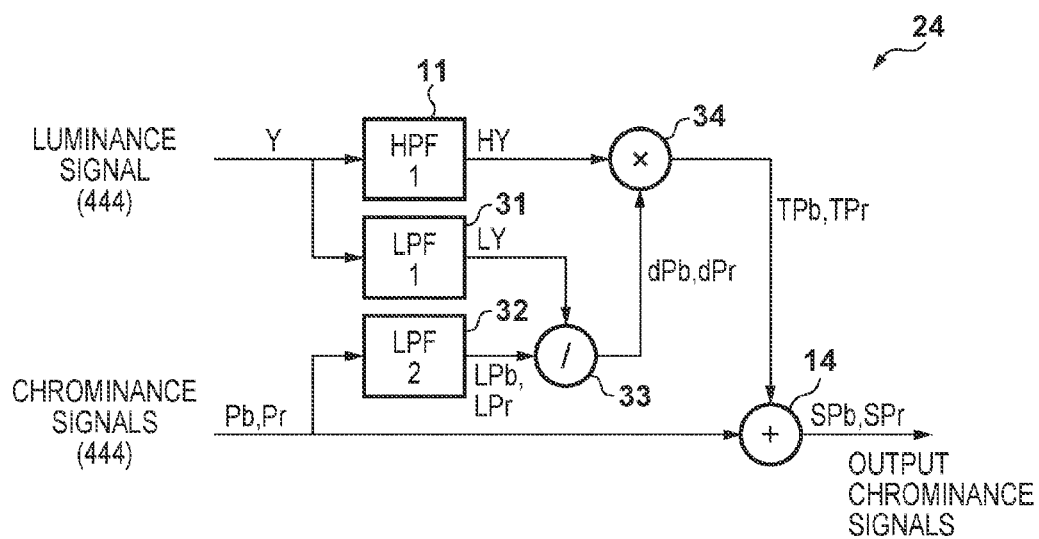
FIG. 5 is a view showing the arrangement of a color shift reduction processing block.

The second embodiment which embodies the inside of a color shift reduction processing block 24 will now be described with reference to FIG. 5. FIG. 5 is a block diagram showing the arrangement of the color shift reduction processing block according to the second embodiment.

In FIG. 5, an HPF 11 extracts a high-frequency component HY from each luminance signal Y input as in FIG. 2. An LPF (low-pass filter) 31 extracts a low-frequency component from the luminance signal. An LPF 32 extracts low-frequency components from chrominance signals. A divider 33 divides the low-frequency components of the chrominance signals by the low-frequency component of the luminance signal. A multiplier 34 multiplies the high-frequency component of Y by a divided value. An adder 14 adds input chrominance signals Pb and Pr and the outputs from the multiplier 34, outputting output chrominance signals SPb and SPr. Note that the LPFs can be configured like, for example, 301 and 304 as described above.

In the second embodiment, first, a low-frequency component LY of each luminance signal Y is extracted by using the LPF 31, and low-frequency components LPb and LPr of the chrominance signals Pb and Pr are extracted by using the LPF 32.

The divider 33 calculates the proportion of the low-frequency components LPb and LPr of the chrominance signals to the low-frequency component LY of the luminance signal, obtaining ratios dPb and dPr (dPb=LPb/LY and dPr=LPr/LY). The multiplier 34 multiplies the high-frequency component HY of each luminance signal Y by these ratios, obtaining TPb and TPr. Further, the adder 14 adds the obtained TPb and TPr to the chrominance signals Pb and Pr, obtaining the output chrominance signals SPb and SPr.

$SPb=Pb+HY\times LPb/LY$ $SPr=Pr+HY\times LPr/LY$

Note that in the second embodiment, the positive/negative signs of the chrominance signals are added to LPb and LPr, and thus the code adder in the first embodiment is not needed.

Note that the ratios of the chrominance signals Pb and Pr to the luminance signals Y (Pb/Y and Pr/Y) may be used by simplifying a circuit without using any LPF.

$SPb=Pb+HY\times Pb/Y$ $SPr=Pr+HY\times Pr/Y$

A processing order can also be given by:

$SPb=(Pb\times LY+HY\times LPb)/LY$ $SPr=(Pr\times LY+HY\times LPr)/LY$

In this case, division is done at the end of calculation, making it possible to make a rounding error smaller and to improve accuracy.

In this case as well, the ratios of the chrominance signals Pr and Pb to the luminance signals Y may be used as the signal ratios without using any LPF.

$SPb=(Pb\times Y+HY\times Pb)/Y$ $SPr=(Pr\times Y+HY\times Pr)/Y$

Further, the values of TPb and TPr may be adjusted by using the coefficient A 12 and the multiplier 13 described with reference to FIG. 2. The value of the A12 in this case can be a value adjustable between, for example, about 0.3 and 4.0.

$$SPb=Pb+A \times HY \times LPb/LY$$

$$SPr=Pr+A \times HY \times LPr/LY$$

In a case without any LPF, calculation is given by:

$$SPb=Pb+A \times HY \times Pb/Y$$

$$SPr=Pr+A \times HY \times Pr/Y$$

As described above, in this embodiment, the chrominance signals are corrected by obtaining a division value by dividing the low-frequency component signals of the chrominance signals by the low-frequency component signal of the luminance signal and adding, to the chrominance signals, a value obtained by multiplying the high-frequency component signal of the luminance component by the division value. It is therefore possible to determine the contribution of the high-frequency component signal appropriately by determining, in accordance with the ratio of the global signal intensity of the chrominance signals and the global signal intensity of the luminance signal, the contribution of the high-frequency component signal of the luminance component to be reflected in the chrominance signals. Moreover, as in the first embodiment, it is possible, by setting a value obtained by multiplying the high-frequency component signal of the luminance component by a predetermined coefficient to a correction value, to adjust the contribution of a luminance value individually in accordance with the characteristic or application of an image.

Third Embodiment

An example of the arrangement for changing whether to add a high-frequency component of a luminance signal for each processing pixel of a corresponding one of chrominance signals will now be described as the third embodiment. There is a case in which only the luminance signal changes in a pixel portion where the chrominance signals changes hardly. It is considered that such a pixel portion is colorless, or only the other chrominance signal changes, and thus a color shift may rather occur by adding the high-frequency component of the luminance signal to the unchanged chrominance signal. Therefore, in this embodiment, a process of reflecting the high-frequency component of the luminance signal is performed only on a region where the spatial frequency of the chrominance signals is distributed exceeding a predetermined frequency, and variations in the chrominance signals exceed a predetermined magnitude. Consequently, the high-frequency component of the luminance signal is not reflected in a region where the distribution of the spatial frequency of the chrominance signals and the variations in the chrominance signals are small. This makes it possible to reduce the color shift caused by adding the high-frequency component of the luminance signal to a portion of the chrominance signals that should not undergo addition.

Color Shift Reduction Processing

Figure 6:
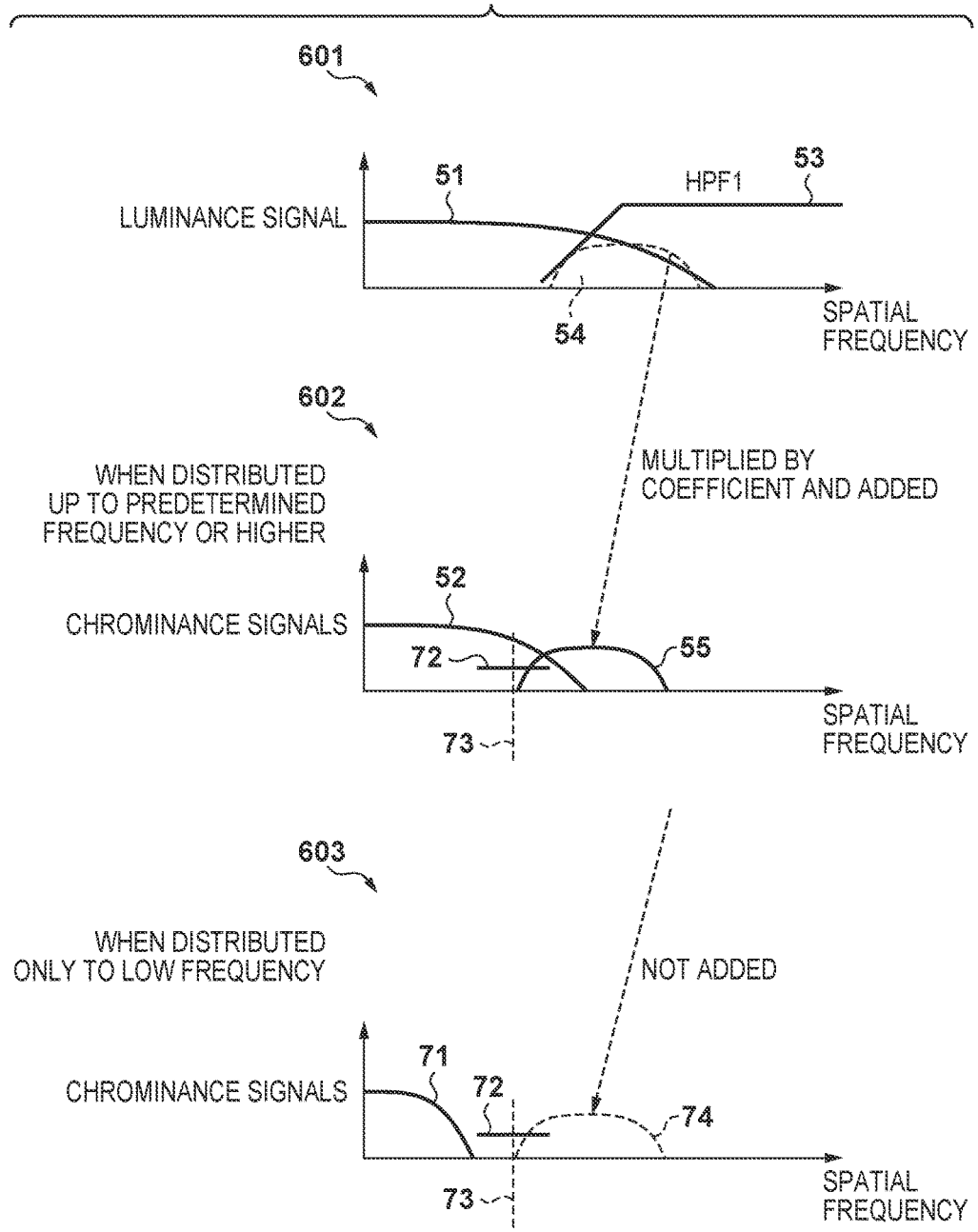
FIG. 6 shows explanatory graphs for explaining the operation of an image processing apparatus.

FIG. 6 shows explanatory graphs for explaining the operation principle of color shift reduction processing according to the third embodiment. A graph 601 shows the spatial frequency distribution of a luminance signal. A graph 602 shows the spatial frequency of chrominance signals when the spatial frequency of the chrominance signals is distributed exceeding a predetermined frequency. A graph 603 shows the spatial frequency of chrominance signals when the spatial frequency of the chrominance signals is distributed only to the predetermined frequency or less.

In FIG. 6, reference numerals 51 to 55 are the same as in FIG. 4, and thus a detailed description thereof will be omitted. Reference numeral 71 denotes a narrow frequency distribution of the chrominance signals. Reference numeral 72 denotes a predetermined threshold. Reference numeral 73 denotes a predetermined spatial frequency. Reference numeral 74 denotes a high-frequency component that is not added to the chrominance signals.

In the narrow frequency distribution 71 of the chrominance signals in 603, the chrominance signals are distributed only in a frequency band lower than the frequency distribution 52 of the chrominance signals in 602. In this embodiment, in order to discriminate a case in which the chrominance signals are distributed only in the low frequency band as described above, the predetermined spatial frequency 73 serving as a threshold and the predetermined threshold 72 of the signal intensity are set in advance. Then, it is judged that the chrominance signals are preferably not changed if spatial frequency components of the chrominance signals at the predetermined spatial frequency 73 are equal to or smaller than the predetermined threshold 72, and the high-frequency component 54 of the luminance signal is not added.

If spatial frequency components of chrominance signals each having an intensity exceeding the threshold 72 are distributed at the spatial frequency 73, the high-frequency component of the luminance signal is multiplied by a coefficient, and then added to the chrominance signals, as shown in 602.

Arrangement of Color Shift Reduction Processing Block

Figure 7:
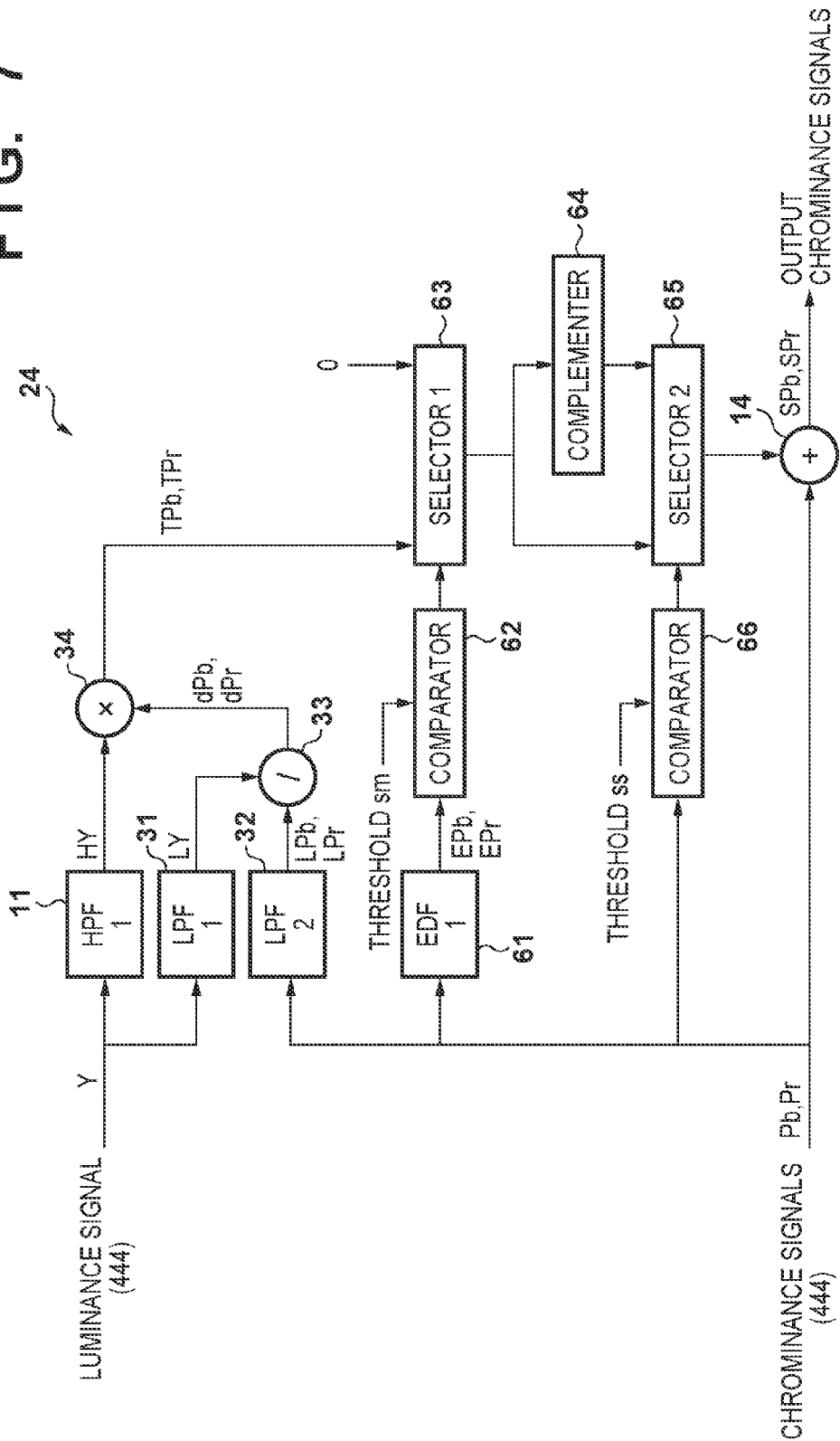
FIG. 7 is a view showing the arrangement of a color shift reduction processing block.

FIG. 7 is a block diagram showing the arrangement of a color shift reduction processing block 24 according to the third embodiment. In FIG. 7, an HPF 11 extracts a high-frequency component HY from each luminance signal Y as in FIG. 2. Reference numerals 31 to 34 are the same as in FIG. 5. As in the second embodiment, the multiplier 34 outputs values Tb and Tr obtained by multiplying the high-frequency component HY of each luminance signal Y by proportions dPb and dPr of low-frequency components LPb and LPr of chrominance signals Pb and Pr to a low-frequency component LY of the luminance signal Y.

An EDF (edge filter) 61 extracts edge components EPb and EPr of the chrominance signals Pb and Pr. A comparator 62 compares a threshold sm with the edge components of the chrominance signals. A selector 63 selects TPb and TPr or 0 by the output of the comparator 62. A complementer 64 calculates a complement obtained by reversing the positive/negative signs of TPb and TPr. A comparator 66 compares a threshold with the chrominance signals. A selector 65 selects TPr and TPr or a complement thereof in accordance with a comparison result of the comparator. An adder 14 adds the output of the selector 63 to the chrominance signals Pr and Pb, outputting output chrominance signals SPb and SPr.

A description will now be given with a particular emphasis on a portion added to the arrangement of FIG. 5 with reference to FIG. 7. The EDF 61 extracts the edge components EPb and EPr from the chrominance signals Pb and Pr. An EDF exemplified by 303 or 306 can be used for the EDF

61. When an input signal is in a 420 format, both edges in a horizontal direction and a vertical direction can be detected by performing absolute value calculation of the outputs of the horizontal EDF and the vertical EDF denoted by 303 and 306, and then combining them. Note that the edges may be detected by using an HPF instead of the EDFs.

Then, the comparator 62 compares the magnitude of the threshold sm and absolute values of the edge components of the chrominance signals, and determines whether the absolute values of the edge components exceed the threshold sm. The comparator 62 outputs 1 if the absolute values exceed the threshold and outputs 0 if the absolute values are equal to or smaller than the threshold. Giving an example of the threshold sm, each edge component takes a value from 0 to 128 when the chrominance signals are in ±128 tones, making it possible to set the threshold sm to a value, for example, from about 10 to about 80. Note that the edge components take positive/negative values, and thus the absolute values are compared with the threshold in this embodiment. The threshold of a frequency whose edge is detected in the EDF 61 corresponds to the predetermined spatial frequency 73 of FIG. 6, and the threshold sm regarding the intensity of each edge component corresponds to the threshold 72 of a signal intensity.

Then, the selector 63 outputs TPb and TPr output by the multiplier 34 if the output of the comparator 62 is 1, and outputs 0 if the output of the comparator 62 is 0.

Then, the comparator 66 compares the magnitude of a threshold ss and the absolute values of the chrominance signals Pb and Pr, and determines whether the absolute values of the chrominance signals exceed the threshold ss. The comparator 66 outputs 1 if the absolute values exceed 1 and outputs 0 if the absolute values are equal to or smaller than the threshold. Then, the selector 65 outputs the output of the selector 63 without any change if the output of the comparator 66 is 1 and outputs a complement of the output of the selector 63 if the output of the threshold is 0. For example, when outputting TPb and TPr, the selector 63 outputs TPb and TPr if the output of the comparator 66 is 1, and outputs complements of TPb and TPr if the output of the comparator 66 is 0.

A direction that corrects chrominance which has a vague value and causes a color shift is determined by the output of the comparator 66 based on this threshold ss. Giving an example of the threshold ss, it is possible to set the threshold ss to a value, for example, from 0 to about 100 when the chrominance signals are in ±128 tones. Note that the chrominance signals take the positive/negative values, and thus the absolute values of the chrominance signals are compared with the threshold ss in this embodiment.

The above-described processing is given by:

$$SPb=Pb+HY \times LPb/LY \text{ if } |EPb|>sm \text{ and } |Pb|>ss$$

$$SPb=Pb-HY \times LPb/LY \text{ if } |EPb|>sm \text{ and } |Pb| \leq ss$$

$$SPb=Pb \text{ if } E|EPb| \leq sm$$

Note that time when only correction to increase saturation is performed is given by:

$$SPb=Pb+HY \times LPb/LY \text{ if } |EPb|>sm \text{ and } |Pb|>ss$$

a case other than this is given by:

$$SPb=Pb.$$

Likewise, in Pr:

$$SPr=Pr+HY \times LPr/LY \text{ if } |EPr|>sm \text{ and } |Pr|>ss$$

$$SPr=Pr-HY \times LPr/LY \text{ if } |EPr|>sm \text{ and } |Pr| \leq ss$$

$$SPr=Pr \text{ if } |EPr| \leq sm$$

Note that time when correction only to increase saturation is performed is given by:

$$SPr=Pr+HY \times LPr/LY \text{ if } |EPr|>sm \text{ and } |Pr|>ss$$

a case other than this is given by:

$$SPr=Pr$$

Note that the selector 63 may be implemented by multiplying TPb and TPr by the output 1 or 0 of the comparator 62. Further, the selector 65 may be implemented by multiplying the output of the selector 63 (TPb and TPr if the output of the comparator 62 is 1) by the output 1 or 0 of the comparator 66. In this case, correction is performed only in a direction that increases saturation. A portion where saturation falls below a correct value is more conspicuous than a portion where saturation exceeds the correct value more than needed, and thus correction is performed only in the direction that increases saturation.

Also in this embodiment, the proportion of the chrominance signals and the luminance signal is not reflected but only a ratio A is reflected, as in the first embodiment. For example, if |EPb|>sm and |Pb|>ss, calculation may be performed as follows:

$$SPb=Pb+A \times HY$$

If |EPb|>sm and |Pb|≤ss, |EPb|≤sm, or only calculation to increase saturation is performed, correction for Pr is also the same, and thus a detailed description thereof will be omitted.

Alternatively, the ratio A may further be used for a multiplication while reflecting the proportion of the chrominance signals and the luminance signal. That is, if |EPb|>sm and |Pb|>ss, calculation may be performed as follows:

$$SPb=Pb+A \times HY \times LPb/LY$$

If |EPb|>sm and |Pb|≤ss, |EPb|≤sm, or only calculation to increase saturation is performed, correction for Pr is also the same.

Also in this embodiment, the output of the HPF 11 may be obtained by subtracting the output of the LPF 31 from an original luminance signal. It is also possible to perform similar edge detection by extracting the high-frequency components for the chrominance signals with the HPF instead of the EDF 61, and expanding the extracted high-frequency components with an absolute value calculator and the LPFs.

A processing principle in this embodiment will be summarized. A case will be considered in which a signal in a 422 format obtained by reducing the resolution of a chrominance signal component included in an image signal in a 444 format is given. As described above, let SF be a sampling frequency of an original image. In this case, the resolution of the chrominance signal component is decreased by half by conversion into the 422 format. Then, in a pixel portion where a spatial frequency component exists up to near SF/2 in chrominance signals of the original image, the frequency component of the chrominance signals after conversion remains up to near SF/4 even if a frequency component exceeding SF/4 is lost by conversion. In other words, if the spatial frequency component exists up to near SF/4 in the chrominance signals after conversion, the frequency component exceeding SF/4 should exist in the chrominance component of the original image. Therefore, in this embodiment, the EDF or the HPF detects the pixel portion near SF/4, and a pixel portion where the intensity thereof exceeds a threshold is corrected by adding a frequency component of a luminance signal exceeding SF/4.

On the other hand, for a pixel portion where there is only the frequency component of the chrominance signals equal to or less than SF/4 (for example, SF/8) in the original image, the spatial frequency of the chrominance signals is distributed at the same SF/4 or less (for example, SF/8) even if they are reduced to the 422 format. Thus, a frequency component equal to or more than SF/4 is not added to such a pixel portion.

As described above, in this embodiment, the chrominance signals are corrected based on the high-frequency component signal of the luminance signal only when the frequency of the chrominance signals is distributed exceeding a predetermined value. This makes it possible to prevent occurrence of a color shift caused by reflecting the high-frequency component of the luminance signal in the pixel portion where the chrominance signals change hardly. In this embodiment, considering a large change in image signal and a conspicuous color shift in each edge portion of an image, such an edge portion is discriminated in particular, and the high-frequency component of the luminance signal is reflected in the chrominance signals. This makes it possible to suppress occurrence of a color shift caused by unnecessary correction while preventing a color shift in a portion that needs correction.

Note that in this embodiment, the example has been described in which the chrominance signals are corrected if the signal intensity of the edge components of the chrominance signals is distributed exceeding the predetermined threshold. However, a concrete arrangement is not limited to this. For example, as has been described with reference to 603, it is determined directly whether the signal intensity of the predetermined frequency component of the chrominance signals is distributed exceeding the predetermined threshold, and the chrominance signals may be corrected if the intensity is distributed exceeding the threshold. Alternatively, the chrominance signals may be corrected if an absolute value of the signal intensity of each chrominance signal exceeds a predetermined value.

Fourth Embodiment

An example of the arrangement for expanding the resolutions of luminance signals and chrominance signals by using high-frequency components of the luminance signals after image processing is performed by reducing the luminance signals in accordance with the resolution of the chrominance signals will now be described as the fourth embodiment.

Arrangement of Image Processing Apparatus

Figure 8:
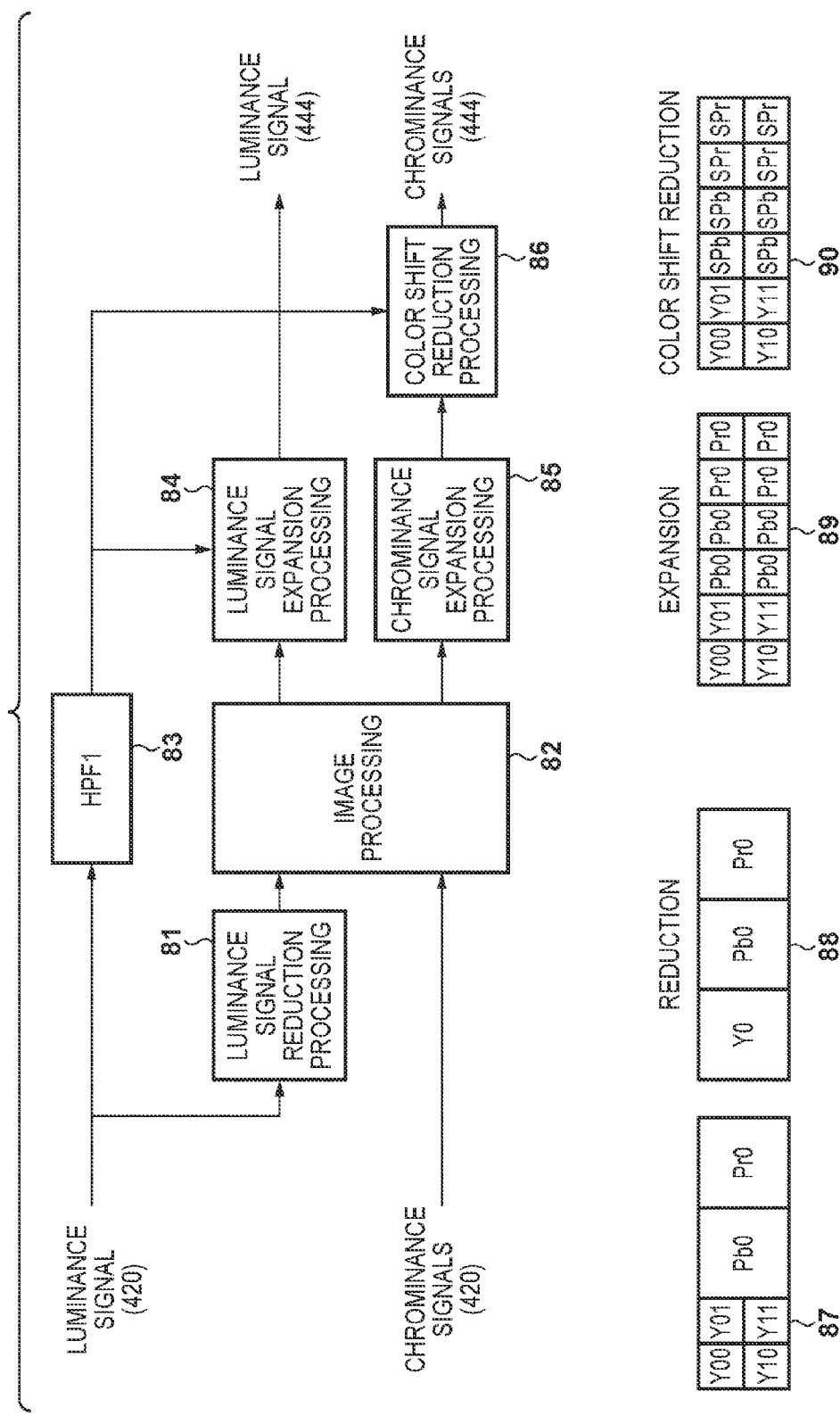
FIG. 8 is a block diagram showing the arrangement of an image processing apparatus.

FIG. 8 is a block diagram showing the arrangement of an image processing apparatus according to the fourth embodiment. In FIG. 8, reference numeral 81 denotes a luminance signal reduction processing block, reference numeral 82 denotes an image processing block, and reference numeral 83 denotes an HPF which extracts the high-frequency components of the luminance signals. A luminance signal expansion processing block 84 expands the luminance signals and adds the high-frequency components. Reference numeral 85 denotes a chrominance signal expansion processing block. Reference numeral 86 denotes a color shift reduction processing block. Reference numeral 87 denotes YPbPr signals in a 420 format. Reference numeral 88 denotes YPbPr signals obtained by reducing Y. Reference numeral 89 denotes YPbPr signals obtained by expanding Y and PbPr. Reference numeral 90 denotes YpbPr signals with a reduced color shift.

In this embodiment, an example will be described in which the 420-format signals 87 are input. For a 422 format or a 411 format, the luminance signal reduction processing block 81 and the luminance signal expansion processing block 84 just change in accordance with a signal format thereof, and thus a similar arrangement is applicable.

When luminance signals of the 420-format signals 87 are input, luminance signals Y are reduced to ½ both in vertical and horizontal directions by the luminance signal reduction processing block 81, and turned into the luminance/chrominance signals 88 having the same resolution as the chrominance signals. The luminance/chrominance signals 88 converted into the same resolution as the chrominance signals suitable for image processing undergoes image processing such as gamma adjustment, color adjustment, or the like in the image processing block 82. The high-frequency components of the original luminance signals Y are saved as the outputs of the HPF 83. It is therefore possible to obtain the luminance signals high in resolution by expanding the luminance signals after image processing double in the vertical and horizontal directions, and adding the high-frequency components of the luminance signals in the luminance signal expansion processing block 84. On the other hand, the chrominance signal expansion processing unit 85 expands the chrominance signals double in the vertical and horizontal directions, obtaining the expanded luminance/chrominance signals 89. In the expanded luminance/chrominance signals 89, while the high-frequency components are added to the luminance signals, the chrominance signals do not include high-frequency signals. Thus, if this is made into RGB as-is and displayed, a color shift appears. To cope with this, the color shift reduction processing block 86 performs color shift reduction processing on the expanded chrominance signals, obtaining the luminance/chrominance signals 90 with a reduced color shift to be output. The inside and processing contents of the color shift reduction processing block 86 in this embodiment are the same as in the first to third embodiments, and thus a description thereof will be omitted.

In this embodiment, the image processing is performed by using the chrominance signals and luminance signals reduced in resolution. Thus, a small image processing circuit will suffice, and the image processing can be performed at high speed. Moreover, the high-frequency components of the luminance signals are reflected in the chrominance signals, and the luminance signals reduced in resolution are expanded and restored by using the high-frequency components of the luminance signals. It is therefore possible to output a high-resolution image with less color shift.

Fifth Embodiment

In the arrangement of FIG. 1, conversion into RGB is performed after performing image processing. However, an embodiment is also considered in which conversion into RGB is performed before or without performing image processing. In that case, color shift reduction processing may be performed while performing conversion into RGB signals.

Figure 9:
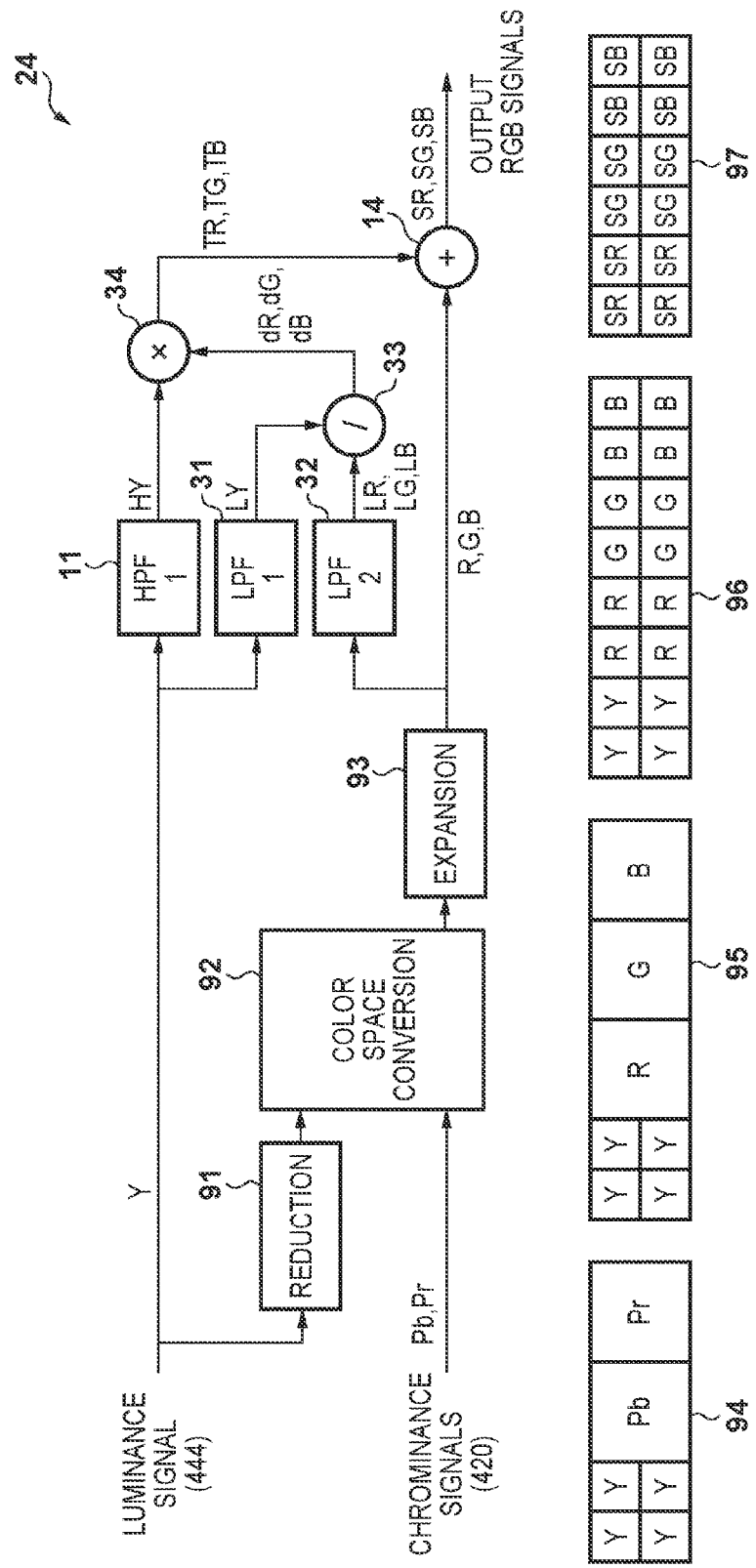
FIG. 9 is a block diagram showing the arrangement of a color shift reduction processing block with respect to RGB signals.

FIG. 9 is a block diagram showing the arrangement of a color shift reduction processing block 24 performed on RGB signals according to the fifth embodiment. In FIG. 9, an HPF 11 extracts a high-frequency component from each luminance signal Y as in FIG. 2. Reference numerals 31 to 34 are the same as in FIG. 5. Of course, in this embodiment, an image is processed in a RGB signal format. Therefore, the LPF 32 extracts low-frequency components LR, LG, and LB from chrominance signals R, G, and B in a RGB format, and outputs them. The divider 33 divides the low-frequency components LR, LG, and LB of the chrominance signals by a low-frequency component LY of each luminance signal Y, and calculates proportions dR, dG, and dB of the low frequency components of the chrominance signals to the low-frequency component of the luminance signal. The multiplier 34 outputs, to a high-frequency component HY of each luminance signal Y, values TR, TG, and TB multiplied by the proportions dR, dG, and dB.

Reference numeral 91 denotes a reduction processing block of the luminance signals Y. A color space conversion processing block 92 performs color space conversion from the reduced luminance signals and chrominance signals Pb and Pr to the RGB signals. Reference numeral 93 denotes an expansion processor.

Reference numeral 94 denotes luminance/chrominance signals in a 420 format. Reference numeral 95 denotes luminance signals high in resolution and RGB signals low in resolution. Reference numeral 96 denotes luminance signals high in resolution and expanded RGB signals. Reference numeral 97 denotes RGB signals high in resolution. As in FIG. 2, an adder 14 adds the expanded RGB signals output by the expansion processor 93 and TR, TG, and TB output by the multiplier 34, outputting output RGB signals SR, SG, and SB.

First, the reduction processor 91 reduces the resolution of the input luminance signals Y to the same resolution as the chrominance signals. The color space conversion processing block 92 converts the luminance signals Y, and the chrominance signals Pr and Pb equal in resolution into the RGB signals.

Conversion equations in this case are predetermined depending on the type of luminance/chrominance signals. For example, for a video signal of ITU-R BT.709 standard, conversion equations are given by:

$$R = Y + 1.15748 \times Pr$$

$$G = Y - 0.187324 \times Pb - 0.468124 \times Pr$$

$$B = Y + 1.8556 \times Pb$$

Note that for a luminance signal which offsets tones of 0 and 100%, color space conversion processing is performed after removing offset and restoring the luminance signal to a full-scale tone signal.

Then, the expansion processor 93 performs twofold expansion processing on the output of the color space conversion processing block 92, obtaining the RGB signals. The expansion processing here creates a pixel to be created newly with interpolation from surrounding pixels. Various methods are known as interpolation methods. It is possible, however, to simplify a circuit by adopting linear interpolation and to obtain smooth characteristics. Of course, other interpolation methods may be used.

Then, the HPF 11 is used to extract the high-frequency component of each luminance signal. Then, the LPF 31 is used to extract the low-frequency component LY of each luminance signal, and the LPF 32 is used to extract the low-frequency components LR, LG, and LB of the RGB signals. The divider 33 calculates the ratio of these two types of low-frequency components, obtaining the ratios dR, dG, and dB. The multiplier 34 multiplies the high-frequency component HY of each luminance signal by these ratios, obtaining TR, TG, and TB. Further, the adder 14 adds them to the RGB signals, obtaining the output RGB signals SR, SG, and SB.

$$SR = R + HY \times LR/LY$$

$$SG = R + HY \times LG/LY$$

$$SB = R + HY \times LB/LY$$

Note that in this embodiment, the RGB signals only indicate positive values, and thus the code adder in the first embodiment is not needed.

There is also an arrangement in which a luminance high-frequency component is processed at a fixed ratio A or further multiplied by the fixed ratio A. For example, the values of TPb and TPr may be adjusted by using the coefficient A 12 and multiplier 13 shown in FIG. 2. The value of A in this case can be set to a value of, for example, about 0.3 to 1.3.

$$SR = R + A \times HY \times LR/LY$$

$$SG = R + A \times HY \times LG/LY$$

$$SB = R + A \times HY \times LB/LY$$

Alternatively, also in this embodiment, high-frequency signals of the luminance signals may be added only to a color signal with the high-frequency component in each RGB signal as described in the third embodiment. That is, by adding an HPF, comparators, and selectors in FIG. 7, an arrangement may be made so as to perform processing in accordance with:

if $|HR| > sm, SR = R + HY \times LR/LY$ if $|HR| \leq sm, SR = R$ if $|HG| > sm, SG = G + HY \times LR/LY$ if $|HG| \leq sm, SG = G$ if $|HB| > sm, SB = B + HY \times LR/LY$ if $|HB| \leq sm, SB = B$ As described above, in this embodiment, each of an R signal component, a G signal component, and a B signal component of the expanded image signals obtained by expanding the resolution of an image signal which is converted from the luminance signals and chrominance signals reduced in resolution into a RGB signal format is corrected by a correction value based on the high-frequency component signals of the luminance signals. It is therefore possible, by converting from the luminance/chrominance signals low in resolution but with less color shift to the RGB signal format, to obtain RGB signals low in resolution but with less color shift. Moreover, correction is performed by using the high-frequency components of the luminance signals after the image converted into the RGB signal format is expanded, making it possible to output a high-resolution image with less color shift.

Note that color space conversion processing is generally performed after occurrence of a color shift caused by expanding the chrominance signals. As in this embodiment, however, occurrence of a color shift can be prevented further by performing expansion processing after color space conversion processing is performed in a state with less color shift by reducing the luminance signals.

However, a processing order of this embodiment causes a shortage of the high-frequency components. Therefore, the high-frequency components of the luminance signals are added at the ratio according to the size of each RGB signal, obtaining RGB signals with less color shift and saved high-frequency components.

Sixth Embodiment

Figure 10:
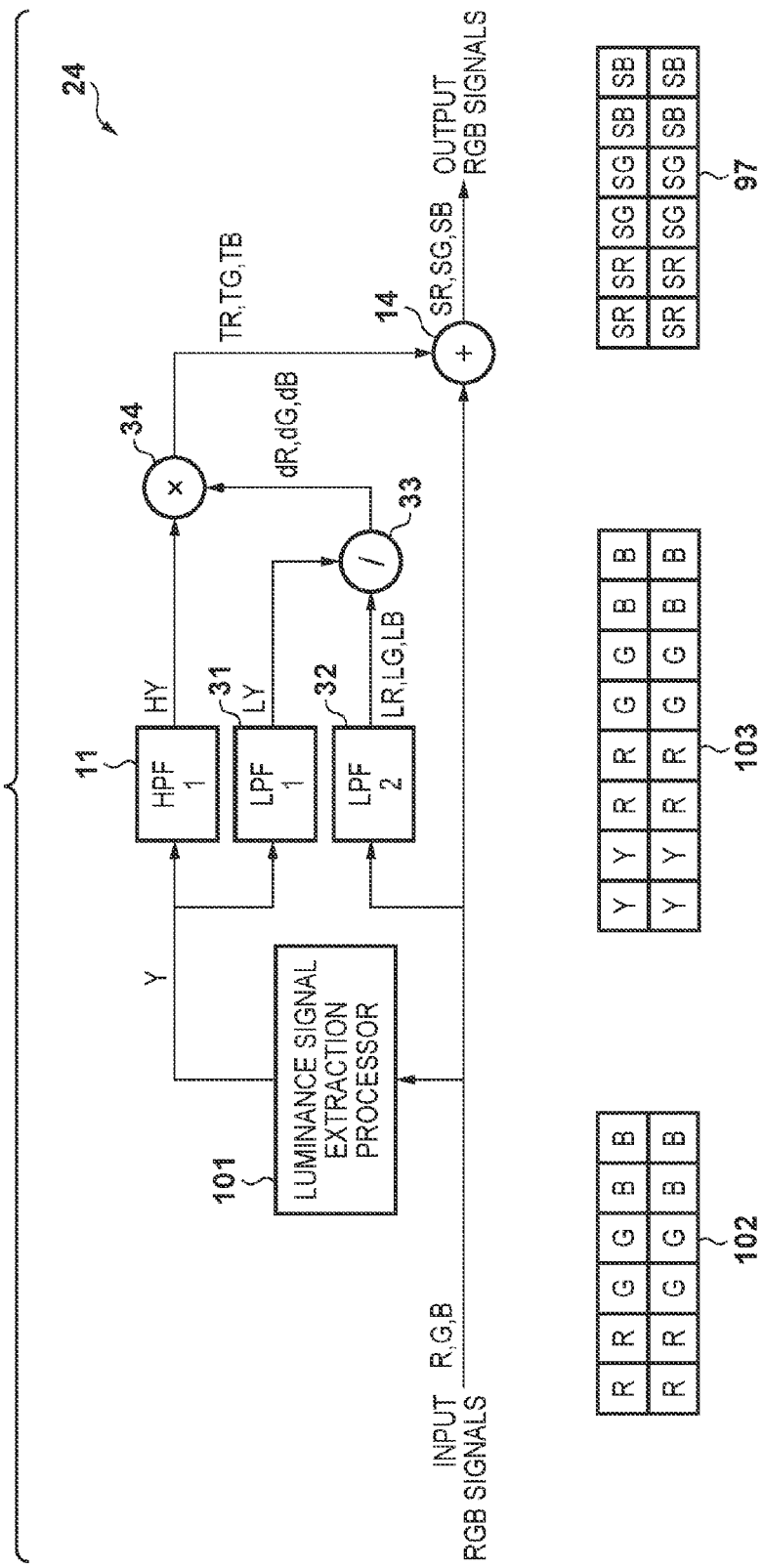
FIG. 10 is a block diagram showing the arrangement of an image processing apparatus.

An arrangement for reducing a color shift from RGB signals that have already suffered from a color shift will now be described as the sixth embodiment. FIG. 10 is a block diagram showing the arrangement of a color shift reduction processing block according to the sixth embodiment.

In FIG. 10, an HPF 11 extracts a high-frequency component HY from each luminance signal Y as in FIG. 2. Reference numerals 31 to 34 are the same as in FIGS. 5 and 9. As in the fifth embodiment, the multiplier 34 outputs values TR, TG, and TB obtained by multiplying the high-frequency component HY of each luminance signal Y by proportions dR, dG, and dB of low-frequency components LR, LG, and LB of signals R, G, and B in a RGB format to a low-frequency component LY of the luminance signal Y. An adder 14 adds the input signals R, G, and B and the outputs TR, TG, and TB of the multiplier 34, outputting output RGB signals SR, SG, and SB. A luminance signal extraction processor 101 extracts the luminance signals Y from the input RGB signals. Reference numeral 102 denotes input RGB signals with a color shift. Reference numeral 103 denotes luminance signals and RGB signals high in resolution. Reference numeral 97 denotes RGB signals high in resolution, as in FIG. 9.

First, the luminance signal extraction processor 101 extracts the luminance signals from the RGB signals. An extraction equation in this case is predetermined depending on the type of luminance signal. For example, for a video signal of ITU-R BT.709 standard, an extraction equation is given by:

$$Y=0.2126 \times R+0.7152 \times G+0.0722 \times B$$

Then, the HPF 11 is used to extract the high-frequency component HY of each luminance signal Y from a Y signal extracted from the RGB signals. Then, the LPF 31 is used to extract the low-frequency component LY of each luminance signal, and the LPF 32 is used to extract the low-frequency components LR, LG, and LB of the RGB signals. The divider 33 calculates the proportions of the low-frequency components LR, LG, and LB of the RGB signals to the low-frequency component LY of each luminance signal, obtaining the ratios dR, dG, and dB. The multiplier 34 multiplies the high-frequency component HY of each luminance signal by these ratios, obtaining TR, TG, and TB. Further, the adder 14 adds them to the RGB signals, obtaining the output RGB signals SR, SG, and SB.

$$SR=R+HY \times LR/LY$$

$$SG=R+HY \times LG/LY$$

$$SB=R+HY \times LB/LY$$

In the sixth embodiment, it is also possible to do a multiplication by a fixed ratio A as in the first embodiment or not to add the fixed ratio A to RGB signals equal to or smaller than a threshold as in the third embodiment.

Needless to say, chrominance signals SPb and SPr even including high-frequency components are obtained by performing color space conversion processing based on the output SR, SG, and SB signals.

As described above, in this embodiment, an image signal is given in a RGB signal format, and each of an R signal component, a G signal component, and a B signal component of the image signal is corrected by a correction value based on high-frequency component signals of the luminance signals. This makes it possible to output a high-resolution image with less color shift.

Note that in the sixth embodiment, the resolutions of the RGB signals are the same, thus extracting the high-frequency components of the luminance signals from the RGB signals. Concerning the resolutions of the RGB signals, if only a G signal is higher in resolution than RB signals like a DualGreen signal, the high-frequency component of the G signal can be extracted to be used instead of the luminance signal.

Seventh Embodiment

In each of the above-described embodiments, an example has been described in which the image processing apparatus is implemented by a dedicated circuit. In this embodiment, an example of the arrangement for performing color shift reduction processing by a general hardware arrangement using a microprocessor or the like will be described with reference to FIGS. 11 and 12.

Figure 11:
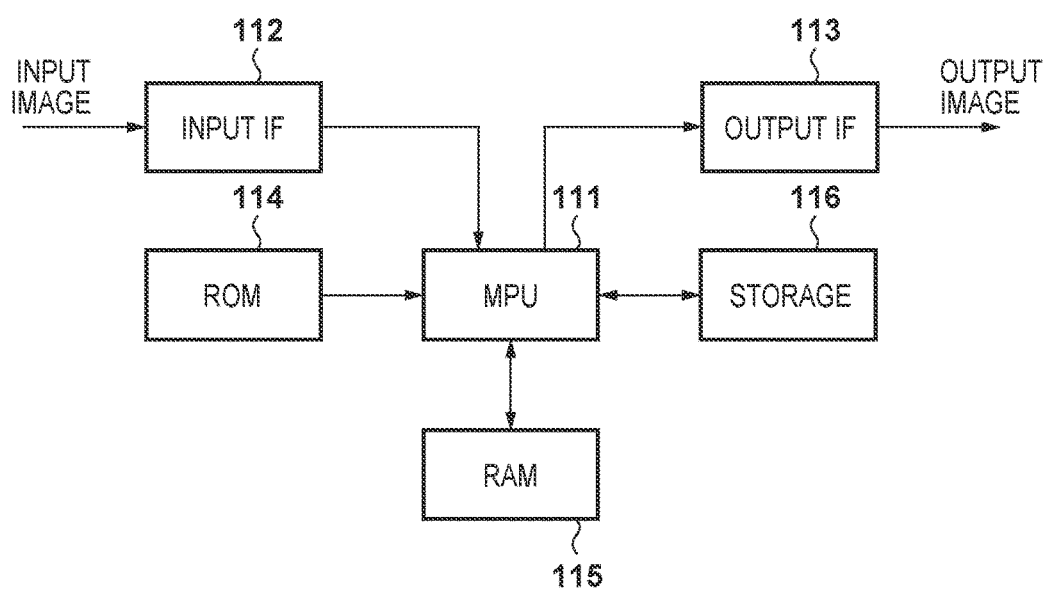
FIG. 11 is a block diagram showing the arrangement of an image processing apparatus using a microprocessor.

FIG. 11 is a block diagram schematically showing the arrangement of an image processing apparatus using the microprocessor according to the seventh embodiment. The image processing apparatus of this embodiment is constituted by a general information processing apparatus such as a personal computer (PC) or a tablet terminal. However, the image processing apparatus may be implemented by a dedicated embedded device or the like.

In FIG. 11, a microprocessor (MPU) 111 performs calculation and control. An input interface 112 inputs an image to be processed. An output interface 113 outputs an image that has undergone image processing. A ROM (Read Only Memory) 114 stores a computer program. A RAM (Random Access Memory) 115 is used as a working memory. A storage 116 temporarily stores an image. Note that the storage 116 may not be provided if the RAM 115 has a capacity large enough to store a plurality of images.

FIG. 12 is a flowchart showing processing performed by the microprocessor according to the seventh embodiment. The flowchart when the microprocessor implements processing of the second embodiment will be described as an example here. However, processing in other embodiments can also be implemented by performing processing in accordance with flowcharts conforming to their contents. Thus, a description of the processing conforming to other embodiments will be omitted.

In the arrangement of FIG. 11, the processing shown in the flowchart of FIG. 12 written in the ROM 114 is performed. Each step of the processing is performed under the control of the MPU 111. Each step of the processing will be described below.

First, in step S1201, an input image is loaded from the input interface 112 to the RAM 115. In step S1202, the loaded input image is separated into a luminance image and chrominance images, and temporarily stored in the storage 116.

In step S1203, the chrominance images undergo expansion processing, are placed on the RAM 115 as expanded images, and are stored in the storage 116. This expansion processing is performed in the same manner as that described in the first embodiment.

HPF processing is performed in step S1204 by using the luminance image temporarily stored in step S1202, obtaining a high-frequency image of the luminance image and temporarily storing it in the storage 116. This HPF processing can do multiplication, addition, and subtraction by a filter coefficient shown in FIG. 3. Note that the luminance high-frequency image can also be obtained by subtracting a luminance LPF image in step S1205 from an original luminance image.

In step S1205, the luminance image is read out from the storage 116 and undergoes LPF processing, obtaining a low-frequency image of the luminance image and temporarily storing it in the storage 116.

In step S1206, the chrominance images that have undergone the expansion processing are read out from the storage 116 and undergo the LPF processing, obtaining low-frequency images of the chrominance images and temporarily storing them in the storage 116.

Then, in step S1207, the chrominance low-frequency images and the luminance low-frequency image are read out from the storage 116, performing division processing of the chrominance low-frequency images by the luminance low-frequency image.

In step S1208, the luminance high-frequency image is read out from the storage 116 to be multiplied by a result of the division processing.

Then, in step S1209, the expanded chrominance images are read out from the storage 116 to be added to a multiplication result.

The chrominance images with a reduced color shift thus obtained are temporarily stored in the storage 116 in step S1210.

In step S1211, predetermined image processing such as color correction or gamma correction is performed by using the luminance image and the chrominance images with the reduced color shift from the storage 116. Luminance/chrominance images resulting from the image processing are converted into RGB images in step S1212.

Then, the RGB images are output via the output interface 113 in step S1213, terminating the process.

In the flowchart described above, the luminance/chrominance images are converted into the RGB images, and then output. However, they may be output as the luminance/chrominance signals.

The arrangement has been described above in which the microprocessor performs the processing as in the second embodiment. It is obvious that the processing in the first and the third to sixth embodiments can be performed in the same manner by using the general microprocessor, and thus a detailed description thereof will be omitted.

According to this embodiment, when image processing that involves expansion of the resolution of an image component signal low in resolution is performed on an image signal including a plurality of image component signals different in resolution, it becomes possible to reduce a color shift by using the general information processing apparatus.

The embodiments of the present invention have been described above by a plurality of arrangement examples. However, the embodiments of the present invention are not limited to the concrete arrangement examples given here as long as they do not depart from the spirit and scope of the present invention. For example, in each embodiment described above, the example has been described in which if the luminance signal is higher in resolution than other image component signals, the correction value based on the high-frequency component signal of the luminance signal is added to other image component signals. Of course, if the resolution of the image component signal other than the luminance signal is higher, correction may be performed based on a high-frequency component signal of that image component signal. This makes it possible to reduce a color shift effectively in accordance with the resolution of the image component signal.

According to the present invention, it is possible to provide a technique of reducing a color shift effectively for the image signal including the plurality of image component signals.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122881, filed Jun. 21, 2016, which is hereby incorporated by reference wherein in its entirety.

What is claimed is:

1. An image processing apparatus comprising:
one or more processors; and
at least one memory coupled to the one or more processors and storing instructions that, when executed by the one or more processors, cause the image processing apparatus to:
input image signals which include a first signal and a second signal lower in spatial resolution than the first signal;
obtain information about a spatial high-frequency component of the first signal which is included in the input image signals;
generate an expanded second signal obtained by expanding the spatial resolution of the second signal included in the image signals by using the obtained information about the spatial high-frequency component of the first signal; and output a processed image signal which includes the generated expanded second signal.

2. The apparatus according to claim 1, wherein the at least one memory stores further instructions that, when executed by the one or more processors, cause the image processing apparatus to:
perform expansion processing of expanding the spatial resolution of the second signal, and
generate the expanded second signal by adding the information about the spatial high-frequency component of the first signal to an intermediate second signal obtained by the expansion processing.

3. The apparatus according to claim 2, wherein the at least one memory stores further instructions that, when executed by the one or more processors, cause the image processing apparatus to determine a value of an intermediate pixel positioned between a first pixel and a second pixel adjacent to each other in the second signal based on linear interpolation of values of the first pixel and the second pixel, performing the expansion processing for the second signal.

4. The apparatus according to claim 2, wherein the at least one memory stores further instructions that, when executed by the one or more processors, cause the image processing apparatus to determine a value of an intermediate pixel positioned between a first pixel and a second pixel adjacent to each other in the second signal as a value of the first pixel, performing the expansion processing for the second signal.

5. The apparatus according to claim 1, wherein the at least one memory stores further instructions that, when executed by the one or more processors, cause the image processing apparatus to perform high-pass filter processing for the first signal, obtaining information about a spatial high-frequency component.

6. The apparatus according to claim 1, wherein the at least one memory stores further instructions that, when executed by the one or more processors, cause the image processing apparatus to:
determine a coefficient based on a ratio of a spatial low-frequency component of the first signal and a spatial low-frequency component of the second signal, and
obtain the information about the spatial high-frequency component based on a multiplication of the coefficient to the spatial high-frequency component of the first signal.

7. The apparatus according to claim 6, wherein the spatial low-frequency component of the first signal is obtained by low-pass filter processing for the first signal, and the spatial low-frequency component of the second signal is obtained by low-pass filter processing for the second signal.

8. The apparatus according to claim 1, wherein the at least one memory stores further instructions that, when executed by the one or more processors, cause the image processing apparatus to:
determine, in accordance with a spatial frequency component of the second signal, of the second signal, a region where the expanded second signal should be generated by using the information about the spatial high-frequency component of the first signal and a region where the expanded second signal should be generated without using the information about the spatial high-frequency component of the first signal, and
generate the expanded second signal in accordance with a determined region.

9. The apparatus according to claim 8, wherein the at least one memory stores further instructions that, when executed by the one or more processors, cause the image processing apparatus to:
perform detection processing for detecting an edge component from the second signal,
determine a region where an edge component not less than a threshold is detected as the region where the expanded second signal should be generated by using the information about the spatial high-frequency component, and
determine a region where the edge component not less than the threshold is not detected as the region where the expanded second signal should be generated without using the information about the spatial high-frequency component.

10. The apparatus according to claim 1, wherein the at least one memory stores further instructions that, when executed by the one or more processors, cause the image processing apparatus to:
reduce the spatial resolution of the input first signal,
perform expansion processing of the spatial resolution on each of an obtained reduced first signal and the input second signal, and
generate the expanded second signal by adding the information about the spatial high-frequency component of the first signal to an intermediate second signal obtained by expansion processing of the second signal.

11. The apparatus according to claim 1, wherein the second signal is a color signal, and wherein the at least one memory stores further instructions that, when executed by the one or more processors, cause the image processing apparatus to:
convert a color space of the input second signal, and
expand a spatial resolution of a converted second signal whose color space is converted.

12. The apparatus according to claim 1, wherein the spatial high-frequency component is a frequency component larger than a predetermined threshold.

13. The apparatus according to claim 1, wherein the first signal is a luminance signal, and the second signals are chrominance signals.

14. The apparatus according to claim 1, wherein the first signal is a first color signal corresponding to a first color component, and the second signal is a second color signal corresponding to a second color component.

15. An image processing apparatus comprising:
one or more processors; and
at least one memory coupled to the one or more processors and storing instructions that, when executed by the one or more processors, cause the image processing apparatus to:
input image signals which include a first signal and a second signal restricted more in spatial high-frequency component than the first signal;
obtain information about the spatial high-frequency component of the first signal which is included in the input image signals;
generate a corrected second signal obtained by correcting the spatial high-frequency component of the second signal included in the image signals by using the obtained information about the spatial high-frequency component of the first signal; and
output a processed image signal which includes the generated corrected second signal.

16. The apparatus according to claim 15, wherein the second signal is a signal which includes no spatial high-frequency component not less than a threshold, and the first signal is a signal that can include the spatial high-frequency component not less than the threshold.

17. An image processing method comprising:
inputting image signals which include a first signal and a second signal lower in spatial resolution than the first signal;
obtaining information about a spatial high-frequency component of the first signal which is included in the input image signals;
generating an expanded second signal obtained by expanding the spatial resolution of the second signal included in the image signals by using the obtained information about the spatial high-frequency component of the first signal; and
outputting a processed image signal which includes the expanded second signal in the generating.

18. The method according to claim 17, wherein in order to generate the expanded second signal, the method comprises:
performing expansion processing of expanding the spatial resolution of the second signal, and adding the information about the spatial high-frequency component of the first signal to an intermediate second signal obtained by the expansion processing.

19. A non-transitory computer-readable storage medium storing a program for causing a computer to execute an image processing method comprising:
inputting image signals which include a first signal and a second signal lower in spatial resolution than the first signal;
obtaining information about a spatial high-frequency component of the first signal which is included in the input image signals;
generating an expanded second signal obtained by expanding the spatial resolution of the second signal included in the image signals by using the obtained information about the spatial high-frequency component of the first signal; and
outputting a processed image signal which includes the generated expanded second signal.

20. The medium according to claim 19, wherein in order to generate the expanded second signal, the method comprises:
performing expansion processing of expanding the spatial resolution of the second signal, and
adding the information about the spatial high-frequency component of the first signal to an intermediate second signal obtained by the expansion processing.

* * * * *